(12) United States Patent
Machunze et al.

(10) Patent No.: US 11,685,511 B2
(45) Date of Patent: Jun. 27, 2023

(54) FLAP SUPPORT FOR SUPPORTING A FLAP OF A WING FOR AN AIRCRAFT

(71) Applicants: AIRBUS DEFENCE AND SPACE GmbH, Taufkirchen (DE); AIRBUS OPERATIONS GmbH, Hamburg (DE)

(72) Inventors: Wolfgang Machunze, Oberhaching (DE); Markus Gibbert, Bremen (DE); Benjamin Ehring, Bremen (DE); Marc Hencke, Ganderkesee (DE)

(73) Assignees: AIRBUS DEFENCE AND SPACE GmbH, Taufkirchen (DE); AIRBUS OPERATIONS GmbH, Hamburg (DE)

( * ) Notice: Subject to any disclaimer, the term of this patent is extended or adjusted under 35 U.S.C. 154(b) by 0 days.

(21) Appl. No.: 17/269,965

(22) PCT Filed: Aug. 14, 2019

(86) PCT No.: PCT/EP2019/071857
§ 371 (c)(1),
(2) Date: Feb. 19, 2021

(87) PCT Pub. No.: WO2020/038807
PCT Pub. Date: Feb. 27, 2020

(65) Prior Publication Data
US 2021/0316840 A1  Oct. 14, 2021

(30) Foreign Application Priority Data
Aug. 20, 2018 (DE) .................... 10 2018 120 250.4

(51) Int. Cl.
*B64C 9/02* (2006.01)
(52) U.S. Cl.
CPC .................... *B64C 9/02* (2013.01)

(58) Field of Classification Search
CPC .... B64C 9/02; B64C 7/00; B64C 3/50; B64C 5/08; B64C 9/18
See application file for complete search history.

(56) References Cited

U.S. PATENT DOCUMENTS 3,594,851 A * 7/1971 Swatton .................... B64C 9/02
244/215
9,926,069 B2   3/2018 Havar et al.
(Continued)

FOREIGN PATENT DOCUMENTS

EP   2 048 077   4/2009
EP   2 578 489   4/2013

OTHER PUBLICATIONS

International Search Report for PCT/EP2019/071857 dated Oct. 23, 2019, 4 pages.
(Continued)

*Primary Examiner* — Tien Q Dinh
*Assistant Examiner* — William L Gmoser
(74) *Attorney, Agent, or Firm* — Nixon & Vanderhye P.C.

(57) ABSTRACT

A flap support for supporting a flap of a wing for an aircraft is disclosed and includes a load bearing fairing shell and a reinforcement structure at least partially received in the interior space of the fairing structure and mounted to the first and second side wall portions of the fairing shell. The fairing shell includes a front attachment device configured for attachment to a main wing, and the reinforcement structure includes an aft attachment device configured for attachment to the main wing. The flap support further includes a hinge device configured for forming an articulated connection to the flap.

14 Claims, 4 Drawing Sheets

(56) References Cited

U.S. PATENT DOCUMENTS

Figure 1:
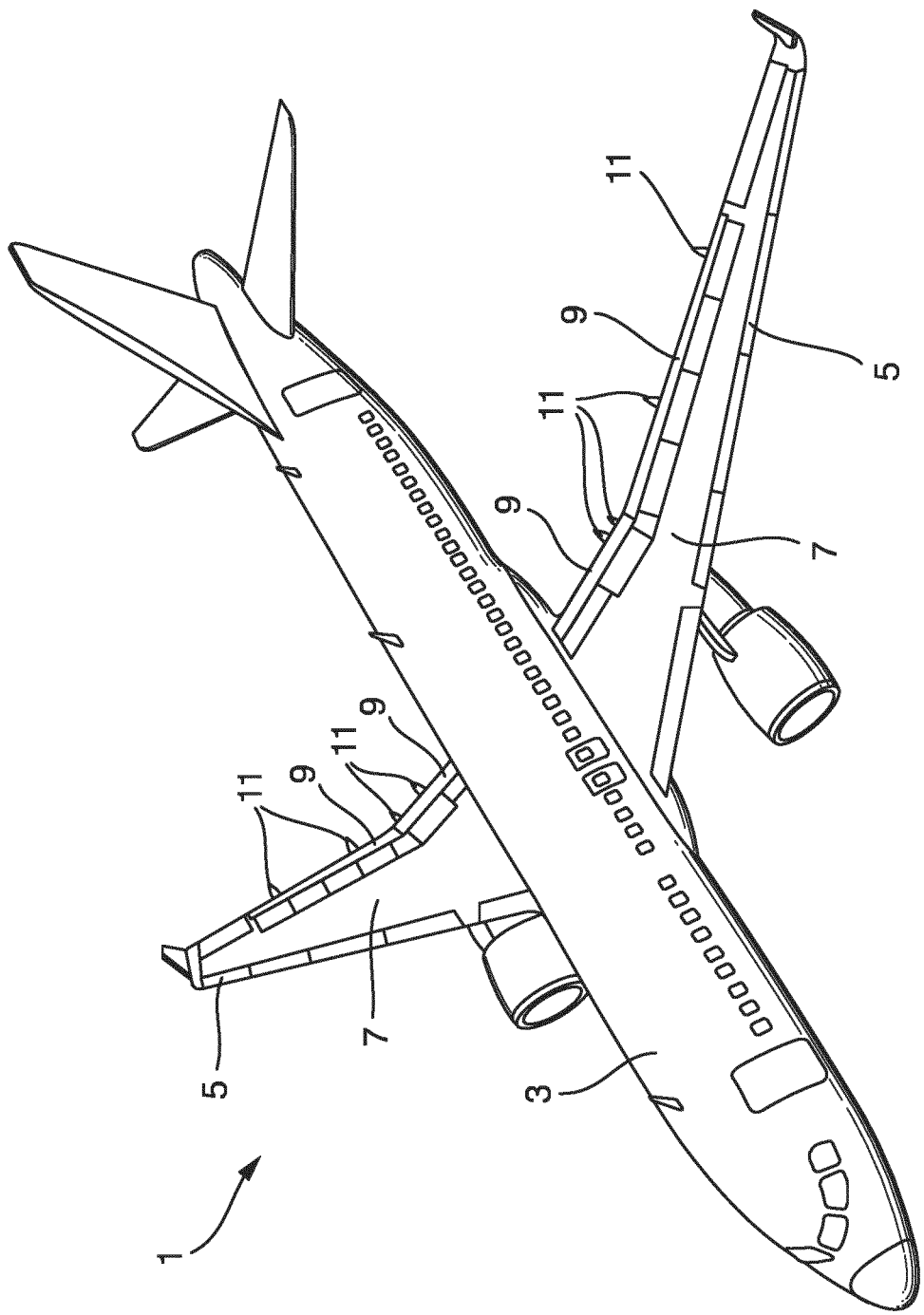

| | | | |
|---|---|---|---|
| 2008/0169383 A1 | 7/2008 | Patzelt et al. | |
| 2013/0087662 A1* | 4/2013 | Soenarjo | B64C 9/18 |
| | | | 244/215 |
| 2015/0203190 A1* | 7/2015 | Witte | B64C 3/58 |
| | | | 244/199.4 |
| 2018/0065731 A1* | 3/2018 | Berthoud | B64C 9/16 |
| 2019/0315449 A1* | 10/2019 | Bowers | B64C 13/38 |

OTHER PUBLICATIONS

Written Opinion of the ISA for PCT/EP2019/071857 dated Oct. 23, 2019, 5 pages.

* cited by examiner

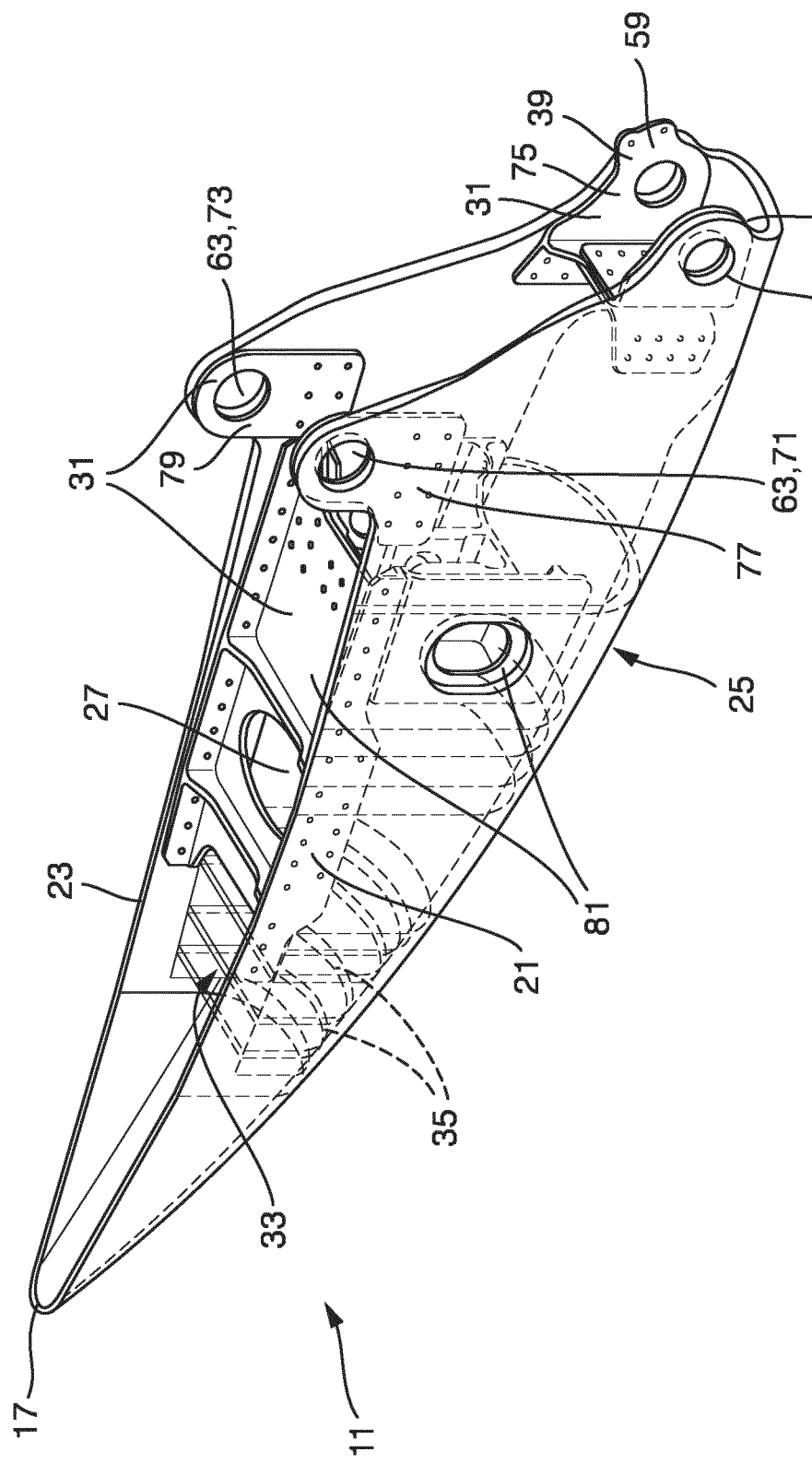

FLAP SUPPORT FOR SUPPORTING A FLAP OF A WING FOR AN AIRCRAFT

CROSS REFERENCE TO RELATED APPLICATIONS

The present application is a National Phase of International Application Number PCT/EP2019/071857 filed Aug. 14, 2019, which designated the U.S. and claims priority benefits from German Patent Application Number DE 10 2018 120 250.4 filed Aug. 20, 2018, the entire contents of each of which are hereby incorporated by reference.

The present invention relates to a flap support for supporting a flap of a wing for an aircraft, in particular for pivotally supporting a high lift trailing edge flap when moved between a retracted position and an extended position. Further aspects of the invention relate to a wing for an aircraft comprising such a flap support, and to an aircraft comprising such a wing.

The flap support comprises an at least partially load bearing fairing shell. The fairing shell extends along a longitudinal axis between a front end and an aft end. Further, the fairing shell has a U-shaped cross section across the longitudinal axis including a first side wall portion, a second side wall portion opposite the first side wall portion, and a bottom wall portion connecting the first and second side wall portions. The fairing shell partially surrounds an interior space that is open to the environment opposite from the bottom wall portion.

The flap support further comprises a reinforcement structure, preferably formed as an integral part. The reinforcement structure is at least partially received in the interior space of the fairing shell and mounted to both the first side wall portion and the second side wall portion at their inner surfaces facing the interior space, to reinforce the fairing shell.

The fairing shell, preferably in the area of the front end, comprises a front attachment device configured for attachment to a main wing. The reinforcement structure comprises an aft attachment device that is spaced from the front attachment device further to the aft end of the fairing shell and that is configured for attachment to the main wing in a position spaced apart from the front attachment device.

The flap support, preferably in the area of the aft end of the fairing shell, further comprises a hinge device configured for forming an articulated connection to the flap, preferably via at least one link element pivotally mounted to the hinge device and to the flap.

Such a flap support is known in the art, for example from U.S. Pat. No. 9,926,069 B2, where the hinge device is formed at the aft end of the fairing shell.

The object of the present invention is to provide a particularly strong and at the same time lightweight flap support.

This object is achieved in that the hinge device forms part of the reinforcement structure. Preferably, the hinge device is formed integrally with the reinforcement structure. In such a way, the loads from the flap, instead of being introduced directly into the fairing shell, are introduced into the reinforcement structure and from the reinforcement structure are transferred gradually to the fairing shell. This leads to a particularly high and fail safe load bearing capacity of the flap support.

According to a preferred embodiment, the fairing shell has a streamlined outer surface. In such a way, the flap support causes minimum aerodynamic drag.

According to another preferred embodiment, the fairing shell is made of fiber reinforced plastic (FRP) material, preferably of carbon fiber reinforced plastic (CFRP) material. FRP material provides high strength at little weight, so that the fairing shell can securely transfer high loads while its weight is kept at a minimum.

According to yet another preferred embodiment, the reinforcement structure is made of metal material, preferably of aluminum material. By the metal reinforcement structure reinforcing the FRP fairing shell a hybrid structure from metal and FRP is formed. In such a way, redundant load paths are included into the flap support. Further, metal material is particularly suitable for receiving the hinge loads from the flap.

According to yet another preferred embodiment, the reinforcement structure comprises a first side section mounted to the first side wall portion, a second side section mounted to the second side wall portion, and a structure bridge connecting the first and second side sections and preferably and formed integrally with the first and second side sections. The first and second side sections form two separate load paths, and the structure bridge transfers loads between the first and second side sections and stiffens the fairing shell in the sideward direction.

In particular, it is preferred that the first side section has a first front portion resting against and mounted to the first side wall portion, and a first aft portion decoupled and spaced apart from the first side wall portion. Further, the second side section has a second front portion resting against and mounted to the second side wall portion, and a second aft portion decoupled and spaced apart from the second side wall portion. The first front portion is preferably mounted to the first side wall portion in a planar way, preferably by a plurality of two-dimensionally distributed rivets. Likewise, the second front portion is preferably mounted to the second side wall portion in a planar way, preferably by a plurality of two-dimensionally distributed rivets. In such a way, loads from the first and second aft portions, e.g. loads introduced by the hinge device, can be smooth and homogeneously transferred to the fairing shell via the first and second front portions.

It is particularly preferred that the structure bridge connects the first aft portion and the second aft portion. In such a way, the first and second aft portions are supported against one another in the sideward direction, specifically to receive the loads introduced from the hinge device.

It is further preferred that the hinge device is provided at the first and second aft portions. Specifically, it is preferred that the first aft portion comprises a first hinge lug and the second aft portion comprises a second hinge lug. In such a way, each hinge lug is connected to a separate load path.

In particular, it is preferred that the fairing shell at its aft end extends beyond the hinge device with the first side wall portion spaced from the first aft portion and the second side wall portion spaced from the second aft portion. Accordingly, these portions of the fairing shell extending between the aft end and the mounting to the reinforcement structure do no transfer any loads and are thus not load bearing portions of the fairing shell. Preferably, the first side wall portion and the second side wall portion comprise bores aligned with the first and second hinge lugs to receive corresponding hinge bolts extending through the first and second hinge lugs. Preferably, the diameter of the bores is greater than the diameter of the hinge lugs, so that load transfer between the hinge bolts and the bores is avoided. In such a way, loads from the flap are transferred by the reinforcement structure only until the mounting of the reinforcement structure to the fairing shell at the first and second front portions.

According to a preferred embodiment, the aft attachment device comprises a first attachment lug formed at the first side section and projecting upwards from the first side section. The first attachment lug is preferably formed at the first front portion so that the first attachment lug is formed by both the reinforcement structure and the fairing shell resting against one another. Further, the aft attachment device comprises a second attachment lug formed at the second side section and projecting upwards from the second side section. The second attachment lug is preferably formed at the second front portion so that the second attachment lug is formed by both the reinforcement structure and the fairing shell resting against one another. In such a way, a simple and strong aft attachment device is formed directly by the reinforcement structure itself.

According to an alternative preferred embodiment, the aft attachment device comprises a first barrel nut mount arranged at the first side section and a second barrel nut mount arranged at the second side section. Such barrel nut mounts are simple and reliable mounting options.

Preferably, between the reinforcement structure and the front end of the fairing shell an additional structure bridge might be provided to form a further reinforcement between the first and second side wall portions.

According to a further preferred embodiment, the front attachment device comprises a plurality of ribs formed in the fairing shell and extending across the longitudinal axis. The ribs comprise holes that are aligned along the longitudinal axis to receive a corresponding bolt mounted to the main wing. In such a way, a simple and reliable front attachment device is formed.

A further aspect of the present invention relates to a wing for an aircraft. The wing comprises a main wing, a flap, and a flap support according to any of the embodiments described above. The front and aft attachment devices are attached to the main wing, preferably in positions spaced apart from one another along the longitudinal axis. The flap is pivotally connected to the hinge device, preferably via one or more link elements. The features and advantages detailed above in connection with the flap support apply vis-à-vis to the wing.

A yet further aspect of the present invention relates to an aircraft comprising the wing according to an embodiment as described above. The features and advantages detailed above in connection with the flap support and the wing apply vis-à-vis to the wing.

Hereinafter, preferred embodiments of the present invention are explained in further detail by means of a drawing. The drawing shows in FIG. 1 a perspective view of an aircraft according to an embodiment of the invention, FIG. 2 a perspective view of a flap support according to a first embodiment of the invention, FIG. 3 a perspective view of a flap support according to a first embodiment of the invention, and FIG. 4 a perspective view of a flap support according to a further embodiment.

In FIG. 1, an aircraft 1 according to the invention is shown. The aircraft 1 comprises a fuselage 3 and wings 5 mounted to the fuselage 3. Each wing 5 comprises a main wing 7, several flaps 9 mounted to the main wing 7, and several flap supports 11 mounted to the main wing 7 to support the flaps 9 in an articulated manner when the flaps 9 are moved between a retracted and an extended position. The flaps 9 are high lift trailing edge flaps.

Figure 2:
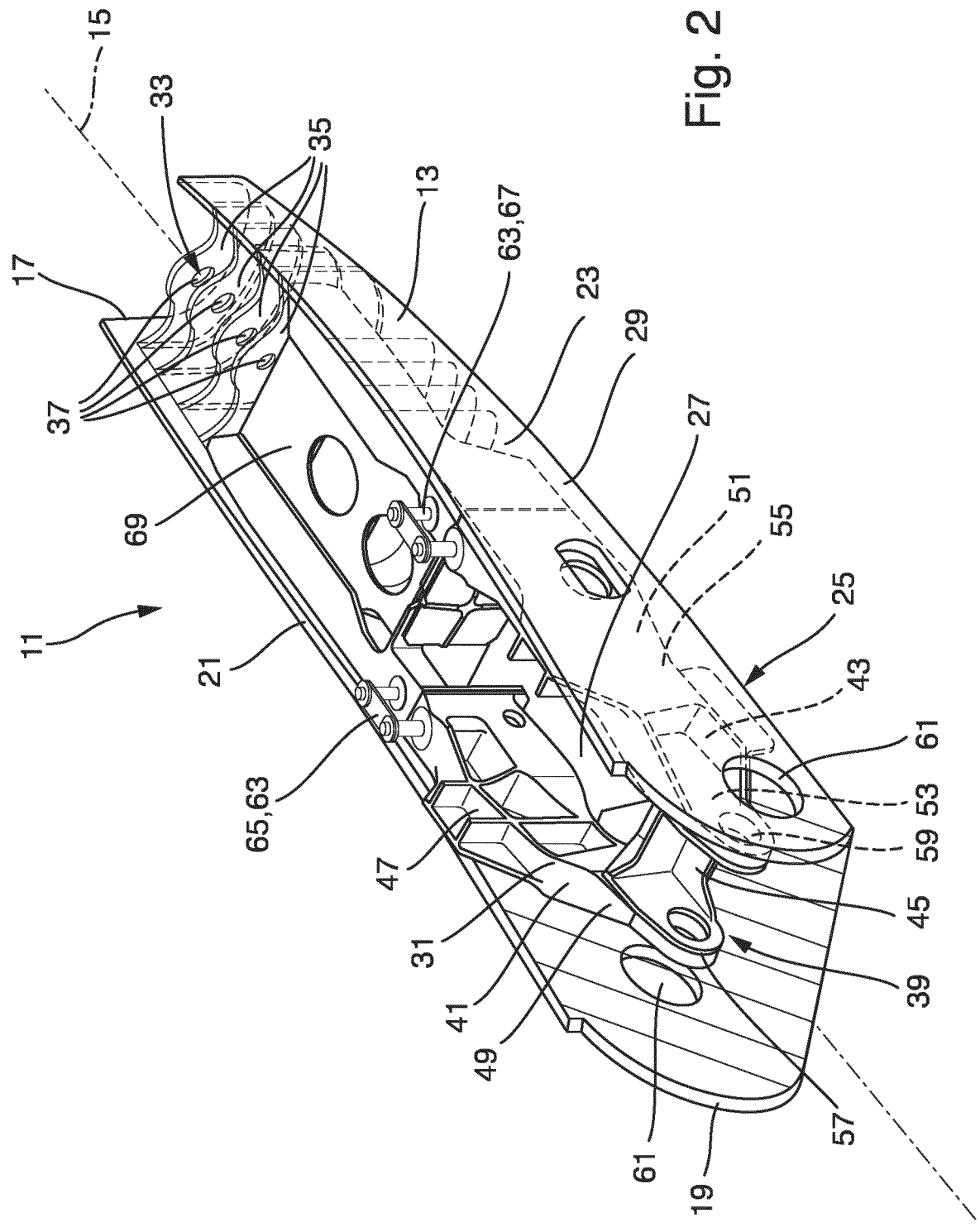

FIG. 2 shows a first embodiment of the flap supports 11 as employed in the aircraft 1 shown in FIG. 1. The flap support 11 comprises a load bearing fairing shell 13. The fairing shell 13 extends along a longitudinal axis 15 between a front end 17 and an aft end 19. Further, the fairing shell 13 has a U-shaped cross section across the longitudinal axis 15 including a first side wall portion 21, a second side wall portion 23 opposite the first side wall portion 21, and a bottom wall portion 25 connecting the first and second side wall portions 21, 23. The fairing shell 13 partially surrounds an interior space 27 that is open to the environment opposite from the bottom wall portion 25. The fairing shell 13 is made of carbon fiber reinforced plastic (CFRP) material and has a streamlined outer surface 29.

The flap support 11 further comprises a reinforcement structure 31 received in the interior space 27 of the fairing shell 13 and mounted to both the first side wall portion 21 and the second side wall portion 23 to reinforce the fairing shell 13. The reinforcement structure 31 is made of milled aluminum material.

The fairing shell 13 in the area of the front end 17 comprises a front attachment device 33 configured for attachment to the main wing 7. The front attachment device 33 comprises a plurality of ribs 35 formed in the fairing shell 13 and extending across the longitudinal axis 15. The ribs 35 comprise holes 37 that are aligned along the longitudinal axis 15 to receive a corresponding bolt (not shown) mounted to the main wing 7.

The flap support 11 in the area of the aft end 19 of the fairing shell 13 further comprises a hinge device 39 configured for forming an articulated connection to the flap 9 via one or more link elements (not shown) pivotally mounted to the hinge device 39 and to the flap 9. The hinge device 39 forms part of the reinforcement structure 31 and is formed integrally with the reinforcement structure 31.

The reinforcement structure 31 comprises a first side section 41 mounted to the first side wall portion 21, a second side section 43 mounted to the second side wall portion 23, and a structure bridge 45 connecting the first and second side sections 41, 43. The first side section 41 has a first front portion 47 resting against and mounted to the first side wall portion 21, and a first aft portion 49 decoupled and spaced apart from the first side wall portion 21. Further, the second side section 43 has a second front portion 51 resting against and mounted to the second side wall portion 23, and a second aft portion 53 decoupled and spaced apart from the second side wall portion 23. The first front portion 47 is mounted to the first side wall portion 21 in a planar way by a plurality of two-dimensionally distributed rivets 55. Likewise, the second front portion 51 is preferably mounted to the second side wall portion 23 in a planar way by a plurality of two-dimensionally distributed rivets 55.

The structure bridge 45 connects the first aft portion 49 and the second aft portion 53. The hinge device 39 is provided at the first and second aft portions 49, 53. The first aft portion 49 comprises a first hinge lug 57 and the second aft portion 53 comprises a second hinge lug 59.

The fairing shell 13 at its aft end 19 extends beyond the hinge device 39 with the first side wall portion 21 spaced from the first aft portion 49 and the second side wall portion 23 spaced from the second aft portion 53. Accordingly, these portions (indicated by shaded area) of the fairing shell 13 extending between the aft end 19 and the mounting to the reinforcement structure 31 do no transfer any loads and are thus not load bearing portions of the fairing shell 13. The first side wall portion 21 and the second side wall portion 23 comprise bores 61 aligned with the first and second hinge lugs 57, 59 to receive corresponding hinge bolts (not shown) extending through the first and second hinge lugs 57, 59. The diameter of the bores 61 is greater than the diameter of the hinge lugs 57, 59, so that load transfer between the hinge bolts and the bores 61 is avoided.

The reinforcement structure 31 comprises an aft attachment device 63 that is spaced from the front attachment device 33 further to the aft end 19 of the fairing shell 13 and that is configured for attachment to the main wing 7 in a position spaced apart from the front attachment device 33. According to the embodiment shown in FIG. 2, the aft attachment device 63 comprises a first barrel nut mount 65 arranged at the first side section 41 and a second barrel nut mount 67 arranged at the second side section 43.

Further, between the reinforcement structure 31 and the front end 17 of the fairing shell 13 an additional structure bridge 69 is provided to form a further reinforcement between the first and second side wall portions 21, 23. The aft attachment device 63, namely the first and second barrel nut mounts 65, 67, are also supported at the additional structure bridge 69.

Figure 3:
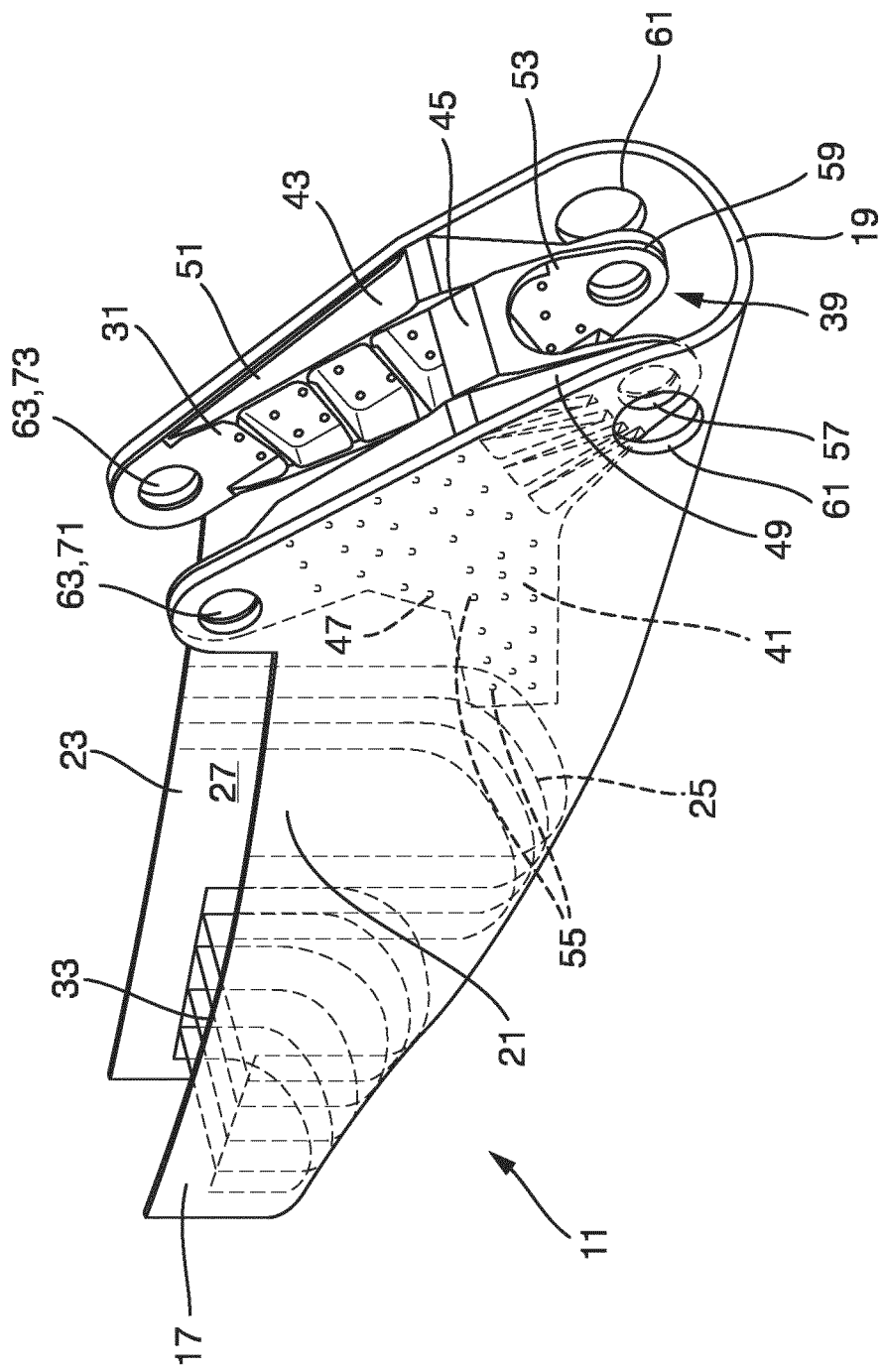

FIG. 3 shows an alternative embodiment of a flap support 11 to be employed at the aircraft 1 shown in FIG. 1. This embodiment corresponds to the embodiment shown in FIG. 2 apart from the aft attachment device 63 instead of comprising first and second barrel nut mounts 65, 67 comprises first and second attachment lugs 71, 73. The first attachment lug 71 is formed at the first side section 41 and projects upwards from the first side section 41. The first attachment lug 71 is formed at the first front portion 47 so that the first attachment lug 71 is formed by both the reinforcement structure 31 and the fairing shell 13 resting against one another. The second attachment lug 73 is formed at the second side section 43 and projects upwards from the second side section 43. The second attachment lug 73 is formed at the second front portion 51 so that the second attachment lug 73 is formed by both the reinforcement structure 31 and the fairing shell 13 resting against one another.

FIG. 4 shows a further embodiment of a flap support 11 that is similar to the embodiment shown in FIG. 3 but that has a reinforcement structure 31 composed of several separate parts. Specifically, the hinge device 39 is, in particular the first and second hinge lugs 57, 59 are, reinforced by a metal hinge lug reinforcement 75. Further, the first and second attachment lugs 71, 73 are reinforced by first and second metal attachment lug reinforcements 77, 79. In addition, several metal bridges 81 are provided connecting the first and second side wall portions 21, 23.

The invention claimed is:

1. A flap support for supporting a flap of a wing for an aircraft, the flap support comprising:
a load bearing fairing shell extending along a longitudinal axis between a front end and an aft end, and having a U-shaped cross section across the longitudinal axis including a first side wall portion, a second side wall portion opposite the first side wall portion, and a bottom wall portion connecting the first and second side wall portions, wherein the fairing shell partially surrounds an interior space, and
a reinforcement structure at least partially received in the interior space and mounted to both the first side wall portion and the second side wall portion,
wherein the fairing shell comprises a front attachment device located at a front end of the reinforcement structure, and configured for attachment to a main wing,
wherein the reinforcement structure comprises an aft attachment device,
wherein the aft attachment device is spaced from the front attachment device further to the aft end of the fairing shell and that is configured for attachment to the main wing,
wherein the flap support further comprises a hinge device located at an aft end of the reinforcement structure,
wherein the hinge device is configured for forming an articulated connection to the flap,
wherein the reinforcement structure further comprises a first side section mounted to the first side wall portion, a second side section mounted to the second side wall portion, and an additional structure bridge connecting the first and second side sections, wherein the additional structure bridge extends from the forward end of the aft attachment device to the aft end of the forward attachment device, and
wherein the hinge device forms part of the reinforcement structure.

2. The flap support according to claim 1, wherein the fairing shell has a streamlined outer surface.

3. The flap support according to claim 1, wherein the fairing shell is made of fiber reinforced plastic material.

4. The flap support according to claim 1, wherein the reinforcement structure is made of metal material.

5. The flap support according to claim 1, wherein the first side section has a first front portion resting against and mounted to the first side wall portion, and a first aft portion decoupled from the first side wall portion, and
wherein the second side section has a second front portion resting against and mounted to the second side wall portion, and a second aft portion decoupled from the second side wall portion.

6. The flap support according to claim 5, wherein the structure bridge connects the first aft portion and the second aft portion.

7. The flap support according to claim 5, wherein the hinge device is provided at the first and second aft portions.

8. The flap support according to claim 7, wherein the first aft portion comprises a first hinge lug and the second aft portion comprises a second hinge lug.

9. The flap support according to claim 8, wherein the fairing shell extends beyond the hinge device with the first side wall portion spaced from the first aft portion and the second side wall portion spaced from the second aft portion, wherein the first side wall portion and the second side wall portion comprise bores aligned with the first and second hinge lugs.

10. The flap support according to claim 1, wherein the aft attachment device comprises a first attachment lug formed at the first side section and projecting upwards from the first side section and a second attachment lug formed at the second side section and projecting upwards from the second side section.

11. The flap support according to claim 1, wherein the aft attachment device comprises a first barrel nut mount arranged at the first side section and a second barrel nut mount arranged at the second side section.

12. The flap support according to claim 1, wherein the front attachment device comprises a plurality of ribs formed in the fairing shell and extending across the longitudinal axis, wherein the ribs comprise holes that are aligned along the longitudinal axis to receive a corresponding bolt mounted to the main wing.

13. A wing for an aircraft, comprising:
   a main wing,
   a flap, and
   a flap support according to claim 1,
   wherein the front attachment device and the aft attachment device are attached to the main wing, and
   wherein the flap is pivotally connected to the hinge device.

14. An aircraft comprising the wing according to claim 13.

* * * * *